(12) United States Patent
Bodnaryk et al.

(10) Patent No.: US 9,313,938 B2
(45) Date of Patent: Apr. 19, 2016

(54) PIN ADAPTER BUSHING FOR RETAINING A FURROWING TIP ON A SHANK BODY

(71) Applicant: Dutch Blacksmith Shop Ltd., Pilot Butte (CA)

(72) Inventors: Ian John Bodnaryk, Pilot Butte (CA); Michael Philip Booy, Pilot Butte (CA); Clark Evan Jack Behrns, Pilot Butte (CA)

(73) Assignee: Dutch Blacksmith Shop Ltd., Pilot Butte, Saskatchewan (CA)

( * ) Notice: Subject to any disclaimer, the term of this patent is extended or adjusted under 35 U.S.C. 154(b) by 0 days.

(21) Appl. No.: 14/481,314

(22) Filed: Sep. 9, 2014

(65) Prior Publication Data

US 2015/0122519 A1 May 7, 2015

Related U.S. Application Data

(60) Provisional application No. 61/900,573, filed on Nov. 6, 2013.

(51) Int. Cl.
*E02F 9/28* (2006.01)
*A01B 35/22* (2006.01)

(52) U.S. Cl.
CPC ............ *A01B 35/225* (2013.01); *E02F 9/2841* (2013.01); *Y10T 403/1624* (2015.01)

(58) Field of Classification Search
CPC ..... E02F 9/2825; E02F 9/2833; E02F 9/2841; Y10T 403/587; Y10T 403/585; A01B 35/225
USPC ................. 37/452–456; 172/699, 713, 772.5; 403/318, 319
See application file for complete search history.

(56) References Cited

U.S. PATENT DOCUMENTS

| | | | | |
|---|---|---|---|---|
| 3,959,901 A * | 6/1976 | Klett | ...................... | E02F 9/2841 172/699 |
| 4,096,653 A * | 6/1978 | Kaarlela | ............... | E02F 9/2841 37/457 |
| 4,823,486 A * | 4/1989 | Diekevers | ............. | E02F 9/2841 37/456 |
| 4,848,013 A * | 7/1989 | Bowman | ............... | E02F 9/2833 37/457 |
| 4,918,843 A * | 4/1990 | Kiesewetter | .......... | E02F 9/2841 267/141 |
| 5,205,057 A * | 4/1993 | Garman | ................ | E02F 9/2841 37/452 |
| 5,956,874 A * | 9/1999 | Ianello | ................... | E02F 9/2825 172/772.5 |
| 7,690,137 B2 * | 4/2010 | Pasqualini | ............ | E02F 9/2841 37/455 |

* cited by examiner

*Primary Examiner* — Robert Pezzuto
(74) *Attorney, Agent, or Firm* — Ryan W. Dupuis; Kyle R. Satherthwaite; Ader Company Inc.

(57) ABSTRACT

An adapter bushing is supported on a furrowing opener of an agricultural implement. The adapter bushing includes a bushing body received by interference fit within a transverse opening in a shank body of the furrowing opener. A cooperating aperture is formed in the bushing body so as to be arranged for alignment with a corresponding pin receiving aperture of a replacement tip body of the furrowing opening such that a retainer pin is arranged to be received simultaneously within the cooperating aperture of the adapter bushing and the pin receiving aperture of the tip body.

16 Claims, 3 Drawing Sheets

US 9,313,938 B2

PIN ADAPTER BUSHING FOR RETAINING A FURROWING TIP ON A SHANK BODY

This application claims the benefit under 35 U.S.C.119(e) of U.S. provisional application Ser. No. 61/900,573, filed Nov. 6, 2013.

FIELD OF THE INVENTION

The present invention relates to an adapter bushing arranged to be received within the opening in a tip mounting portion of a shank body on an agricultural implement, and more particularly the present invention relates to an adapter bushing which receives a retainer pin by interference fit through co-operating apertures in the adapter bushing and a furrowing tip selectively retained on the tip mounting portion of the shank body.

BACKGROUND

In the field of agriculture it is common to provide an implement arrangement having a frame which carries a plurality of furrowing openers thereon, each comprises of a shank body mounted on the frame and a tip body selectively supported on the shank body. The tip body defines a point which forms the furrow in the ground and is arranged to be releasably supported on the shank body for replacement as the tip becomes worn.

One arrangement of furrowing opener is available by Bourgault Tillage Tools in which the shank body has a forward projecting tip mounting portion received in the rear socket of a replaceable tip body. The tip body is secured to the mounting portion using a bolt and nut combination available under the model number 200-BNC-3100. In this instance a square nut is received within a mating square opening in the tip mounting portion of the shank body for alignment with an aperture in the tip body such that the bolt can be inserted through the aperture in the tip body subsequent to mounting the tip body over top of the nut and tip mounting portion of the shank body. A threaded attachment can then be made between the bolt and the nut in which the bolt extends transversely to the forward working direction to effectively retain the tip body on the opener body. Due to the use of the tool in the ground for forming furrows, the threaded connection unfortunately can become seized from the exposure to the elements such that the tip body becomes very difficult to replace. Furthermore, the square nut must be manufactured with very close tolerances relative to the corresponding square opening in the tip mounting portion of the shank body which receives the nut therein to securely position the nut, otherwise the nut is undesireably loosely received within the corresponding opening. Manufacturing with such close tolerances can be difficult and costly.

SUMMARY OF THE INVENTION

According to one aspect of the present invention there is provided an adapter bushing for use with a furrowing opener on an agricultural implement to form a furrow in a forward working direction of the implement in which the furrowing opener includes i) a shank body including a main portion supported on the agricultural implement and a tip mounting portion protruding forwardly from the main portion which locates a transverse opening extending laterally therethrough transversely to the forward working direction, ii) a tip body including a socket formed in a rear side thereof which receives the tip mounting portion of the shank body therein in which the tip body includes a transverse aperture extending laterally therethrough transversely to the forward working direction in alignment with the socket, and iii) a retainer pin extending through the transverse aperture of the tip body so as to selectively retain the tip body on the shank body, the adapter bushing comprising:
  a bushing body received within the transverse opening of the shank body; and
  a cooperating aperture formed in the bushing body in alignment with the transverse aperture of the tip body such that the retainer pin is arranged to be received within the cooperating aperture of the adapter bushing together with the transverse aperture of the tip body.

According to a second aspect of the invention there is provided a furrowing opener for use on an agricultural implement to form a furrow in a forward working direction of the implement, the furrowing opener comprising:
  a shank body including a main portion arranged to be supported on the agricultural implement and a tip mounting portion protruding forwardly from the main portion which locates a transverse opening extending laterally therethrough transversely to the forward working direction;
  a tip body including a socket formed in a rear side thereof which receives the tip mounting portion of the shank body therein, the tip body including a transverse aperture extending laterally therethrough transversely to the forward working direction in alignment with the socket;
  an adapter bushing received within the transverse opening of the shank body and including a cooperating aperture therein in alignment with the transverse aperture of the tip body; and
  a retainer pin extending through the transverse aperture of the tip body and the cooperating aperture of the adapter bushing so as to selectively retain the tip body on the shank body.

According to a third aspect of the present invention there is provided a method of supporting a furrowing opener on an agricultural implement to form a furrow in a forward working direction of the implement, the method comprising:
  providing a shank body having a main portion supported on the agricultural implement and a tip mounting portion protruding forwardly from the main portion which locates a transverse opening extending laterally therethrough transversely to the forward working direction;
  providing a tip body having a socket formed in a rear side thereof which receives the tip mounting portion of the shank body therein, the tip body including a transverse aperture extending laterally therethrough transversely to the forward working direction in alignment with the socket;
  providing an adapter bushing including a cooperating aperture therein inserting the adapter bushing into the transverse opening of the shank body;
  inserting the tip mounting portion of the shank body into the socket in the tip body such that the transverse aperture of the tip body is in alignment with the cooperating aperture in the adapter bushing; and
  inserting a retainer pin through the transverse aperture of the tip body and the cooperating aperture of the adapter bushing so as to selectively retain the tip body on the shank body.

Preferably the adapter bushing is received within the transverse opening in the shank body by interference fit.

The adapter bushing may further include a radial slot extending from an inner surface defining the auxiliary aperture to an outer surface along a full length of the bushing in an axial direction of the auxiliary aperture. In this instance, the radial slot is preferably compressed in size in a circumferential direction about the auxiliary aperture in a mounted position within the transverse opening relative to a relaxed state of the adapter bushing separated from the shank body.

The retainer pin may be received by interference fit within the auxiliary aperture of the adapter bushing, by interference fit within the transverse aperture of the tip body, or by interference fit within both.

By providing an adapter bushing which is suited for interference fit within the opening of a tip mounting portion of a shank body together with a cooperating aperture therein which receives a retainer pin by interference fit therein, the tip body can be securely attached relative to the tip mounting portion of the shank body in an effective manner which remains, readily replaceable and is not subject to seizing like the threads of the prior art. Furthermore, by providing a slotted bushing arranged for interference fit, a greater range of manufacturing tolerances are permitted to simplify and reduce cost in the manufacturing process.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
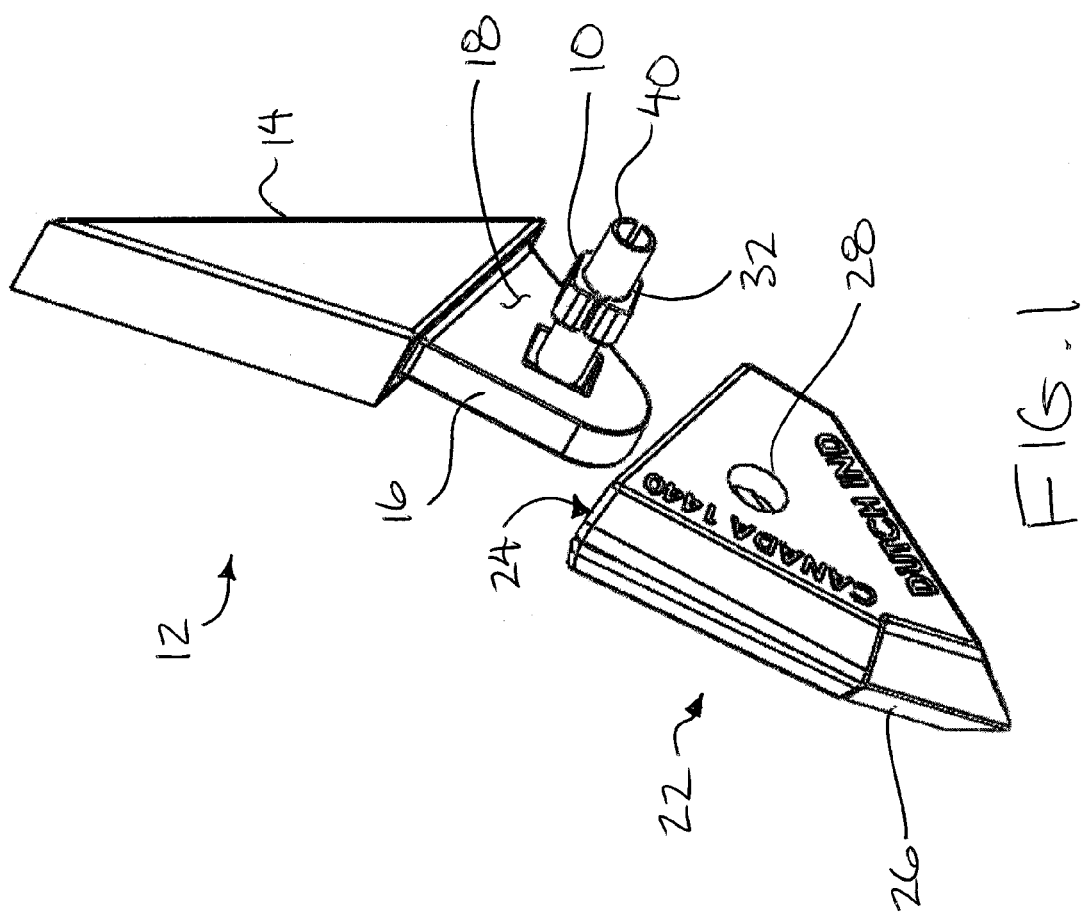
FIG. 1 is a perspective view of a tip body separated from a shank body together with the adapter bushing of the present invention which receives a retainer pin therein.
Figure 2:
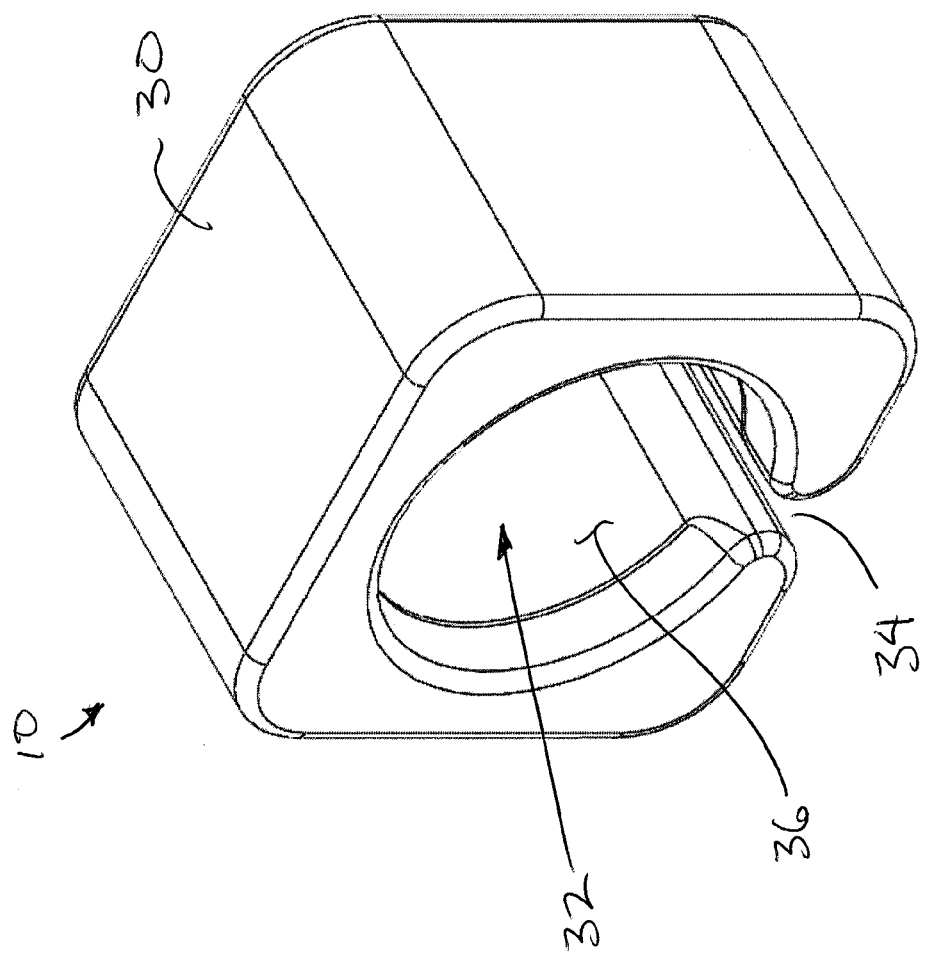
FIG. 2 is a perspective view of the adapter bushing.
Figure 4:
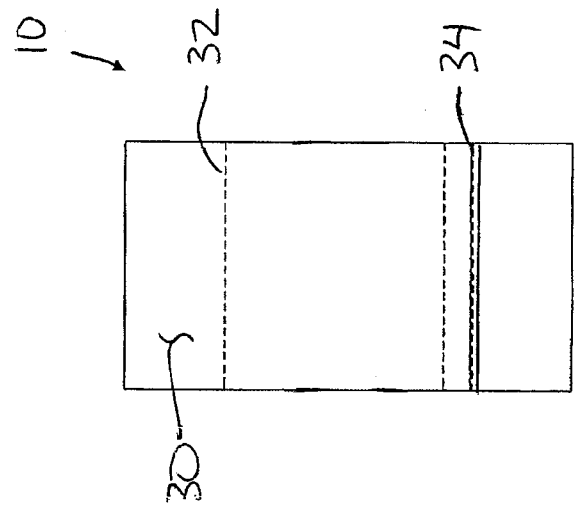
FIG. 4 is a side elevational view of the adapter bushing according to FIG. 3.
Figure 3:
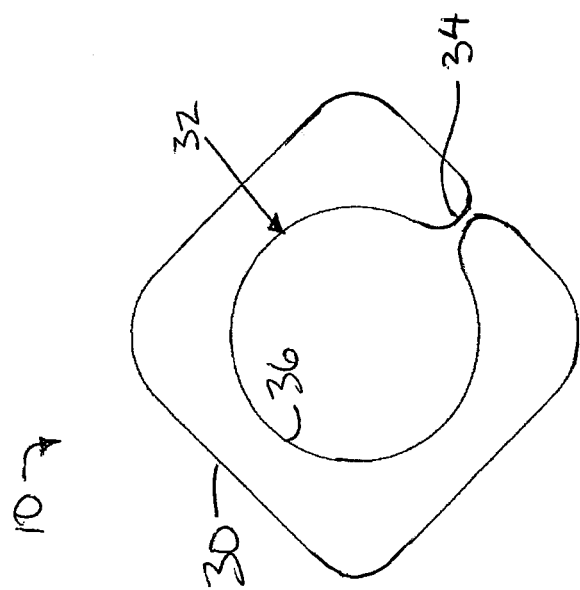
FIG. 3 is an end elevational view of the adapter bushing.

Referring to the accompanying figures, there is illustrated an adapter bushing generally indicated by reference numeral 10. The bushing 10 is particularly suited for use with a furrowing opener 12 of the type used on an agricultural implement such as a cultivator or seeder.

Typically, the implement mounts a plurality of the openers 12 thereon for forming respective furrows in the ground which extend in the forward working direction as the implement is displaced forwardly across the ground. Each furrowing opener 12 generally includes a main portion 14 which is selectively supported on the frame of the implement and a tip mounting portion 16 which protrudes forwardly from the main portion. In the illustrated embodiments, the tip mounting portion is generally triangular so as to define two opposing flat sides 18 which are vertical and laterally opposed from one another so as to be parallel and oriented in the forward working direction. The two triangular shaped flat sides 18 are oriented such that a single apex of the tip mounting portion defines the forwardmost portion of the tip mounting portion 16 which protrudes generally downwardly and forwardly into the working direction.

A transverse opening 20 is formed in the tip mounting portion to extend laterally fully through the tip mounting portion between the two opposing flat sides 18 perpendicularly to the forward working direction. The opening is generally square in cross-section.

A tip body 22 is arranged to be mounted on the tip mounting portion 16 of the shank body. The tip body includes a socket 24 formed in the rear side thereof which is arranged to matingly receive the tip mounting portion 16 of the shank body therein. The socket accordingly comprises two laterally opposed flat sides for spanning respective opposing sides 18 of the tip mounting portion. A forward portion of the tip body 22 extends downwardly and forwardly to define a knife point 26 supporting a carbide tip thereon which forms the leading edge of a furrow formed in the ground as the tip is advanced in the forward working direction.

The tip body 22 further includes a transverse aperture 28 which extends in the lateral direction perpendicularly to the forward working direction fully through the tip body between the two laterally opposing sides thereof. The transverse aperture 28 is aligned with the socket to extend through both of the two opposing sides of the socket. The transverse aperture 28 is arranged to be aligned with the transverse opening 20 when the tip body is mounted on the tip mounting portion of the shank body.

The adapter bushing 10 comprises a unitary body which fits within the transverse opening 20 in the tip mounting portion of the shank body by interference fit at the outer surface 30 thereof. The outer surface 30 is generally square in cross section so as to mate with the square cross section of the transverse opening within which it is received. The overall length of the bushing in the lateral direction, perpendicular to the forward working direction of the implement corresponds approximately to the lateral thickness of the tip mounting portion between the two opposing flat sides 18 thereof. Accordingly, the bushing can be fully received within the transverse opening 20 in the tip mounting portion prior to insertion of the tip mounting portion into the socket of the tip body as the tip body is mounted on the shank body.

The adapter bushing 10 includes a cooperating aperture 32 extending in a lateral direction through the bushing. The cooperating aperture has an interior diameter which is approximately equal to the transverse aperture 28 of the tip body and is positioned within the body of the bushing for alignment with the transverse aperture when the tip body is mounted on the shank body.

The adapter bushing further includes a radial slot 34 formed therein which extends radially from an inner surface 36 defining the cooperating aperture 32 to the outer surface 30. The slot 34 also extends the full length in the axial direction of the aperture 32 between laterally opposed ends of the bushing so as to define a generally C-shaped cross section of the bushing along the full length thereof. The slot defines a gap in the circumferential direction of the adapter bushing in a relaxed state of the bushing when separated from the shank body.

The cross sectional dimension at the outer surface of the adapter bushing is arranged to be slightly oversized relative to the interior cross sectional dimension of the transverse opening 20 so as to result in an interference fit. By pressing the bushing into the transverse opening in the shank body, the bushing is arranged to be circumferentially compressed such that the thickness of the gap in the circumferential direction is reduced relative to the relaxed state of the bushing upon mounting of the bushing within the transverse opening within the shank body.

Once the bushing has been inserted into the transverse opening and the tip body is mounted overtop of the tip mounting portion of the shank body, the tip body is retained relative to the shank body by a retainer pin 40. The retainer pin is arranged to be received by interference fit into both the transverse aperture 28 of the tip body and the cooperating aperture 32 defined within the adapter bushing.

The retainer pin 40 comprises a roll pin having a generally C-shaped cross section formed of spring steel so as to be elastically compressible in a circumferential direction. More particularly, the pin is compressed from a relaxed state to a state of reduced diameter for insertion into the transverse apertures 28 and cooperating aperture 32 whereby the resilience of the retainer pin provides sufficient outward pressure into the surrounding aperture to frictionally retain the retainer pin within the apertures and thereby selectively retain the tip body on the shank body.

The adapter bushing 10 is specifically sized for being interchanged with conventional square nuts mounted in the square transverse openings of prior art shank bodies to permit mounting of new tip bodies with transverse apertures 28 formed therein which receive the retainer pin 40 therethrough in cooperation with the cooperating aperture 32 of the bushing.

In further embodiments, the adapter bushing and the transverse opening in the shank body may non-circular cross-sections which are different from one another, but which are arranged to mate non-rotatably relative to one another. For example the bushing may have a hexagonal cross-section which is non-rotatably mated by interference fit within a square transverse opening in the shank body.

Furthermore, the adapter bushing may be formed of various materials including steel, aluminum, or plastic.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A furrowing opener for use on an agricultural implement to form a furrow in a forward working direction of the implement, the furrowing opener comprising:
 a shank body including a main portion arranged to be supported on the agricultural implement and a tip mounting portion protruding forwardly from the main portion which locates a transverse opening having a square cross section with a prescribed interior dimension extending laterally fully through between laterally opposing sides of the tip mounting portion of the shank body, transversely to the forward working direction;
 a tip body including a socket formed in a rear side thereof which receives the tip mounting portion of the shank body therein, the tip body including a transverse aperture having an interior diameter which is reduced relative to the prescribed interior dimension of the transverse opening extending fully through the tip mounting portion of the shank body, the transverse aperture of the tip body extending laterally fully through the tip body, transversely to the forward working direction in alignment with the socket;
 an adapter bushing received within the transverse opening of the shank body and including i) an outer surface which is sized and shaped to fit non-rotatably within the square cross section of the transverse opening extending fully through the tip mounting portion of the shank body and ii) a cooperating aperture having an interior diameter extending fully through the adapter bushing in the lateral direction which is reduced in size relative to prescribed interior dimension of the transverse opening in the shank body and which is in alignment with the transverse aperture of the tip body; and
 a retainer pin extending through the transverse aperture of the tip body and the cooperating aperture of the adapter bushing, the retainer pin having an outer diameter along a length of the retainer pin which is sized to fit within the interior diameter of the cooperating aperture in the adapter bushing so as to selectively retain the tip body on the shank body.

2. The furrowing opener according to claim 1 wherein the outer surface of the adapter bushing is sized to be received within the prescribed interior dimension of the transverse opening in the shank body by interference fit.

3. The furrowing opener according to claim 1 wherein the adapter bushing has a square cross section which is arranged to fit within and mate non-rotatably relative to the square cross section of the transverse opening extending fully through the tip mounting portion of the shank body.

4. The furrowing opener according to claim 1 wherein the adapter bushing includes a radial slot extending from an inner surface defining the cooperating aperture to an outer surface along a full length of the bushing in an axial direction of the cooperating aperture.

5. The furrowing opener according to claim 4 wherein the radial slot is compressed in size in a circumferential direction about the cooperating aperture in a mounted position within the transverse opening relative to a relaxed state of the adapter bushing separated from the shank body.

6. The furrowing opener according to claim 1 wherein the retainer pin is received within the cooperating aperture of the adapter bushing by interference fit.

7. The furrowing opener according to claim 1 wherein the retainer pin is received within the transverse aperture of the tip body by interference fit.

8. The furrowing opener according to claim 1 wherein the retainer pin comprises an elastically compressible roll pin.

9. An adapter bushing for use with a furrowing opener on an agricultural implement to form a furrow in a forward working direction of the implement in which the furrowing opener includes i) a shank body including a main portion supported on the agricultural implement and a tip mounting portion protruding forwardly from the main portion which locates a transverse opening extending laterally fully through between opposing sides of the tip mounting portion transversely to the forward working direction, ii) a tip body including a socket formed in a rear side thereof which receives the tip mounting portion of the shank body therein in which the tip body includes a transverse aperture extending laterally therethrough transversely to the forward working direction in alignment with the socket, and iii) a retainer pin extending through the transverse aperture of the tip body so as to selectively retain the tip body on the shank body, the adapter bushing comprising:
 a bushing body having an outer surface which is adapted to be received by interference fit within the transverse opening in the tip mounting portion of the shank body and to extend in the lateral direction across a full width between the opposing sides of the tip mounting portion of the shank body; and
 a cooperating aperture formed in the bushing body to extend fully through the bushing body in the lateral direction for in alignment with the transverse aperture of the tip body, the cooperating aperture having an interior dimension which is reduced in size relative to the transverse opening across the full width in the lateral direction so as to be adapted to receive the retainer pin therein by interference fit when the retainer pin is received within the transverse aperture of the tip body.

10. The adapter bushing according to claim 9 further comprising a radial slot extending from an inner surface of the bushing body defining the cooperating aperture to an outer surface of the bushing body along a full length of the bushing body in an axial direction of the cooperating aperture.

11. The adapter bushing according to claim 10 wherein the radial slot is arranged to be compressed in size in a circumferential direction about the cooperating aperture in a mounted position within the transverse opening relative to a relaxed state of the adapter bushing separated from the shank body.

12. A method of supporting a furrowing opener on an agricultural implement to form a furrow in a forward working direction of the implement, the method comprising:

providing a shank body having a main portion supported on the agricultural implement and a tip mounting portion protruding forwardly from the main portion which locates a transverse opening having a square cross section with a prescribed interior dimension extending laterally fully through between laterally opposing sides of the tip mounting portion of the shank body, transversely to the forward working direction;

providing a tip body having a socket formed in a rear side thereof which receives the tip mounting portion of the shank body therein, the tip body including a transverse aperture having an interior diameter which is reduced relative to the prescribed interior dimension of the transverse opening extending fully through the tip mounting portion of the shank body, the transverse aperture of the tip body extending laterally fully through the tip body, transversely to the forward working direction in alignment with the socket;

providing an adapter bushing including i) an outer surface which is sized and shaped to fit non-rotatably within the square cross section of the transverse opening extending fully through the tip mounting portion of the shank body and ii) a cooperating aperture having an interior diameter extending fully through the adapter bushing in the lateral direction which is reduced in size relative to prescribed interior dimension of the transverse opening in the shank body;

inserting the adapter bushing into the transverse opening of the shank body;

inserting the tip mounting portion of the shank body into the socket in the tip body such that the transverse aperture of the tip body is in alignment with the cooperating aperture in the adapter bushing;

providing a retainer pin having an outer diameter along a length of the retainer pin which is sized to fit within the interior diameter of the cooperating aperture in the adapter bushing; and inserting the retainer pin through the transverse aperture of the tip body and the cooperating aperture of the adapter bushing so as to selectively retain the tip body on the shank body.

13. The method according to claim 12 including inserting the adapter bushing within the transverse opening in the shank body by interference fit.

14. The method according to claim 12 including providing the adapter bushing with a radial slot extending from an inner surface defining the cooperating aperture to an outer surface along a full length of the bushing in an axial direction of the cooperating aperture, and compressing the radial slot in size in a circumferential direction about the cooperating aperture as the adapter bushing is inserted into the transverse opening of the shank body.

15. The method according to claim 12 including inserting the retainer pin within the cooperating aperture of the adapter bushing by interference fit.

16. The method according to claim 12 including inserting the retainer pin within the transverse aperture of the tip body by interference fit.

* * * * *